(12) United States Patent
Greenberg et al.

(10) Patent No.: US 12,032,810 B1
(45) Date of Patent: Jul. 9, 2024

(54) MEDIA GENERATING SYSTEM AND METHOD

(71) Applicant: Sceneplay, Inc., Los Angeles, CA (US)

(72) Inventors: Ann Greenberg, Los Angeles, CA (US); Philippe Piernot, Palo Alto, CA (US)

(73) Assignee: SCENEPLAY, INC., El Cerrito, CA (US)

( * ) Notice: Subject to any disclaimer, the term of this patent is extended or adjusted under 35 U.S.C. 154(b) by 0 days.

(21) Appl. No.: 17/188,956

(22) Filed: Mar. 1, 2021

Related U.S. Application Data

(63) Continuation of application No. 16/445,160, filed on Jun. 18, 2019, now Pat. No. 10,936,168, which is a
(Continued)

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06Q 10/06* (2013.01); *G06Q 10/10* (2013.01); *G11B 27/034* (2013.01); *H04N 7/16* (2013.01); *H04N 21/47205* (2013.01); *H04N 21/4788* (2013.01); *H04N 21/8543* (2013.01)

(58) Field of Classification Search
CPC ..... G06F 3/0481; G06F 3/0484; G06Q 10/06; G06Q 10/10; G11B 27/034; H04N 7/16; H04N 21/47205; H04N 21/4788; H04N 21/8543
See application file for complete search history.

(56) References Cited

U.S. PATENT DOCUMENTS 2,934,601 A 4/1960 Oppenheimer
3,461,228 A 8/1969 Bookman
(Continued)

FOREIGN PATENT DOCUMENTS

JP 2002099867 A 5/2002
JP 2006217183 A 8/2006
(Continued)

OTHER PUBLICATIONS

Burkhart, John, "The Videomaker Guide to Video Production", pp. 94-95, Oct. 2007, 2 pages.
(Continued)

*Primary Examiner* — Eric J. Bycer
(74) *Attorney, Agent, or Firm* — Manatt, Phelps & Phillips, LLP

(57) ABSTRACT

A media generation system and method are provided. The system has a media generation computer that has a store that contains a marked-up script with a scene having a plurality of shots that each has a plurality of splitscenes and a computing device that uses a streaming protocol and receives a rendered sceneplay from the media generation computer. The media generation computer automatically directs actors with stage and blocking directions to generate recorded splitscenes and automatically edits and combines the recorded splitscenes.

32 Claims, 12 Drawing Sheets

Related U.S. Application Data continuation of application No. 14/660,877, filed on Mar. 17, 2015, now Pat. No. 10,346,001, which is a continuation of application No. 12/499,686, filed on Jul. 8, 2009, now Pat. No. 9,002,177.

(60) Provisional application No. 61/079,041, filed on Jul. 8, 2008.

(51) Int. Cl.
*G06Q 10/06* (2023.01)
*G06Q 10/10* (2023.01)
*G11B 27/034* (2006.01)
*H04N 7/16* (2011.01)
*H04N 21/472* (2011.01)
*H04N 21/4788* (2011.01)
*H04N 21/8543* (2011.01)

(56) References Cited

U.S. PATENT DOCUMENTS

| | | | |
|---|---|---|---|
| 4,049,907 A | 9/1977 | Damon | |
| 5,488,433 A | 1/1996 | Washino et al. | |
| 6,154,600 A | 11/2000 | Newman et al. | |
| 6,208,373 B1 | 3/2001 | Fong et al. | |
| 6,226,615 B1 | 5/2001 | Kirby et al. | |
| 6,596,031 B1 | 7/2003 | Parks | |
| 7,324,166 B1 | 1/2008 | Joslin et al. | |
| 7,665,021 B2 | 2/2010 | Randall et al. | |
| 8,297,754 B2 | 10/2012 | Kwag et al. | |
| 8,340,493 B2 | 12/2012 | Axen et al. | |
| 8,560,951 B1 | 10/2013 | Snyder et al. | |
| 8,621,354 B2 | 12/2013 | Henderson et al. | |
| 9,002,177 B2 | 4/2015 | Greenberg et al. | |
| 9,330,719 B2 | 5/2016 | Axen et al. | |
| 10,346,001 B2 | 7/2019 | Greenberg et al. | |
| 10,936,168 B2 | 3/2021 | Greenberg et al. | |
| 2002/0178082 A1 | 11/2002 | Krause et al. | |
| 2003/0001846 A1 | 1/2003 | Davis et al. | |
| 2003/0090507 A1 | 5/2003 | Randall et al. | |
| 2003/0115598 A1 | 6/2003 | Pantoja | |
| 2003/0172108 A1* | 9/2003 | Paul | G06F 16/40 709/219 |
| 2004/0070674 A1 | 4/2004 | Foote et al. | |
| 2004/0267816 A1 | 12/2004 | Russek | |
| 2005/0005244 A1 | 1/2005 | Chesley et al. | |
| 2005/0010880 A1 | 1/2005 | Schubert et al. | |
| 2005/0022125 A1 | 1/2005 | Powell | |
| 2005/0053359 A1 | 3/2005 | Jung et al. | |
| 2005/0227218 A1 | 10/2005 | Mehta et al. | |
| 2006/0053468 A1 | 3/2006 | Sudoh et al. | |
| 2006/0150100 A1 | 7/2006 | Braun et al. | |
| 2006/0187336 A1* | 8/2006 | Rosenberg | A63F 13/25 348/370 |
| 2006/0193606 A1 | 8/2006 | Lamkin et al. | |
| 2006/0294571 A1 | 12/2006 | Moore et al. | |
| 2007/0168413 A1* | 7/2007 | Barletta | G06F 16/9577 707/E17.121 |
| 2007/0234214 A1 | 10/2007 | Lovejoy et al. | |
| 2007/0288978 A1 | 12/2007 | Pizzurro et al. | |
| 2008/0028312 A1 | 1/2008 | Alvarez et al. | |
| 2008/0088696 A1 | 4/2008 | Giraldo | |
| 2008/0092047 A1 | 4/2008 | Fealkoff et al. | |
| 2008/0288913 A1* | 11/2008 | Creighton | G06F 8/10 717/100 |
| 2008/0307304 A1 | 12/2008 | Feiler et al. | |
| 2009/0003794 A1 | 1/2009 | Heatherly et al. | |
| 2009/0024963 A1 | 1/2009 | Lindley et al. | |
| 2009/0035733 A1* | 2/2009 | Meitar | G09B 7/00 434/118 |
| 2009/0259623 A1 | 10/2009 | Mooneyham et al. | |
| 2009/0280897 A1 | 11/2009 | Fitzmaurice et al. | |
| 2010/0013836 A1 | 1/2010 | Kang et al. | |
| 2010/0031149 A1 | 2/2010 | Gentile et al. | |
| 2010/0050083 A1 | 2/2010 | Axen et al. | |
| 2010/0153520 A1 | 6/2010 | Daun et al. | |
| 2011/0035684 A1 | 2/2011 | Lewis et al. | |
| 2016/0189750 A1 | 6/2016 | Axen et al. | |

FOREIGN PATENT DOCUMENTS

| | | |
|---|---|---|
| JP | 2008118468 A | 5/2008 |
| WO | WO2007082171 A2 | 7/2007 |
| WO | WO2005010880 A1 | 12/2007 |
| WO | WO2007149575 A2 | 12/2007 |

OTHER PUBLICATIONS

Montgomery, Mark "Final Draft 7 Scriptwriting Software Review", Jul. 1, 2005, 4 pages.
Miller, Loren S "Smart Scripting. Final Draft 7 and Final Draft A/V", Jul. 2006, 3 pages.
Alaxandratos, Jonathan, Product Review of Final Draft Scriptwriting Software, Jun. 2006, 1 page.
Jinhong et al, "intelligent Digital Filmaker DMP", Proceedings of the Fifth International Conference on Computational Intelligence and Media Applications (ICCIMA'03), IEEE 2003, 6 pages.
Matsuda et al, "Creative Lessons by using Cyber Theater and CTSL Learning Kit", IADIS, pp. 157-164, 2004, 8 pages.

* cited by examiner

```
<head>
  <script_title>Accountants</script_title>
  <script_id>325734</script_id>
  <script_copyright owner="NewCorp" date="1994" />
  <script_author>John White</script_author>
  ...
</head>
<body>
  <scene
    id="1235"
    estimated_duration="241245"
    notes="JUSTIN and BENJAMIN work together..."
    setting="Interior, office kitchen"
    time_of_day="day">
    <shot
      async="true"
      audio="Benjamin"
      video="Benjamin"
      stage_direction="Pull a soda from the refrigerator"
      product_placement="soda"
      camera_angle="high"
      camera_lens_length="close up"
      estimated_duration="4" />
    </shot>
    <shot
      audio="Benjamin" video="Benjamin"
      blocking="screen left"
      camera_angle="straight on"
      camera_lens_length="medium close up">
      Thirsty? It's on me.
    </shot>
    <shot audio="Justin" video="Benjamin">
      No. I grabbed something on the way in.
    </shot>
    <shot audio="Benjamin" video="Benjamin">
```

FIG. 4A

Did you get the accounting report I sent last Thursday? Nice follow through.
  </shot>
  <shot audio="Justin" video="Benjamin">
    Don't be rude.
  </shot>
  <shot audio="Benjamin" video="Benjamin" stage_direction="He leans screen left and grabs donut from off screen without looking.">
    Donut?
  </shot>
  <split_screen>
    <shot audio="Justin" video="Justin" stage_direction="Enters and sits at table."></shot>
    <shot audio="Benjamin" video="Benjamin" stage_direction="Lifts accounting report from off screen."></shot>
  </split_screen>
</scene>

MEDIA GENERATING SYSTEM AND METHOD

PRIORITY CLAIM/RELATED APPLICATION

This application is a continuation of and claims priority under 35 USC 120 to U.S. patent application Ser. No. 16/445,160 filed Jun. 18, 2019, and titled "MEDIA PRESENTATION GENERATING SYSTEM AND METHOD USING RECORDED SPLITSCENES" (now U.S. Pat. No. 10,936,168 issued Mar. 2, 2021), that in turn is a continuation of and claims priority under 35 USC 120 to U.S. patent application Ser. No. 14/660,877, filed Mar. 17, 2015 and titled "SYSTEM AND METHOD FOR DESCRIBING A SCENE FOR A PIECE OF MEDIA" (now U.S. Pat. No. 10,346,001 issued Jul. 9, 2019) that in turn is a continuation of and claims priority under 35 USC 120 to U.S. patent application Ser. No. 12/499,686, filed Jul. 8, 2009 and entitled "MEDIA GENERATING SYSTEM AND METHOD" (now U.S. Pat. No. 9,002,177 issued on Apr. 7, 2015) that in turn claims the benefit under 35 USC 119(e) and priority under USC 120 to U.S. Provisional Patent Application Ser. No. 61/079,041 filed on Jul. 8, 2008 and entitled "Media Generating System and Method", the entirety of all of which are incorporated by reference.

FIELD

A media generation system and method is provided and the system and method is particularly applicable to a piece of video media.

BACKGROUND

Movies are typically made by studios for mass distribution to audiences. The tools to generate media (e.g., camcorders, Web Cameras, etc.) have become progressively cheaper, the cost of production has gone down, and there has been an adoption of both tools and production by a mass audience. While such tools come with instructions on how to operate the tool, lessons on what kind of content to create have not been forthcoming.

There has been a proliferation in User Generated Content (UGC). Sites such as Youtube™ (when not showing commercial content created for mostly offline media or home movies) show that consumers have taken the cheaper tools to heart. UGC, however, is rarely compelling, and most often is amateurish.

There are existing media system and services which are currently employed by users to generate and manipulate entertainment content. For example, there are multi-player games and virtual worlds that are avatar-based, animated settings where users can interact with other animated characters in a spontaneous, non-scripted way. (See Second Life™ at www.secondlife.com). There are also websites that permit a user to generate an avatar based movie using a game engine. (See www.machinima.com). There are also tools that allow a user to record, edit, post and share media, allowing them to be creators and distributors. There are also video assemblers and sequencers that provide a drag and drop way for users to create their own sequences of previously recorded material such as ways to synchronize their own photos and video to music to create more compelling presentations of their personal media. There are also systems that permit mashups wherein users can combine together found footage or user generated combinations of media (often in random combinations, or unified by theme or graphics, but not based upon scripts.) There are also community stories (Wiki stories) that are stories written by multiple participants with text-based co-creative effort. There are also web based solutions for generating simple animated scenarios wherein users choose settings, time, characters, dialog and/or music. Finally, there are "Cinema 2.0" efforts that are more sophisticated efforts at crowd sourced script generation and video coverage in order to assemble a linear movie-type experience online that allow users to bypass high budget productions.

However, these existing systems and services do not provide a language and platform that will allow users to generate content that can be combined with a plurality of other users' content (within a social network) so that the users appear to be in the same scene together. It is desirable for users to see themselves in the story (thus earning their "15 MB of Fame"). Along with their remote peers, users want to interact with a plurality of other users of a social network, to create nonlinear narratives. None of the existing systems and methods provide the proper data, technology and social network that enables an easy-to-use user-generated interactive cinema system and it is to this end that the present invention is directed.

BRIEF DESCRIPTION OF THE DRAWINGS

FIGS. 4A-B illustrate two examples of a marked-up script code that may be used by the media generation system;

DETAILED DESCRIPTION OF ONE OR MORE EMBODIMENTS

Figure 1:
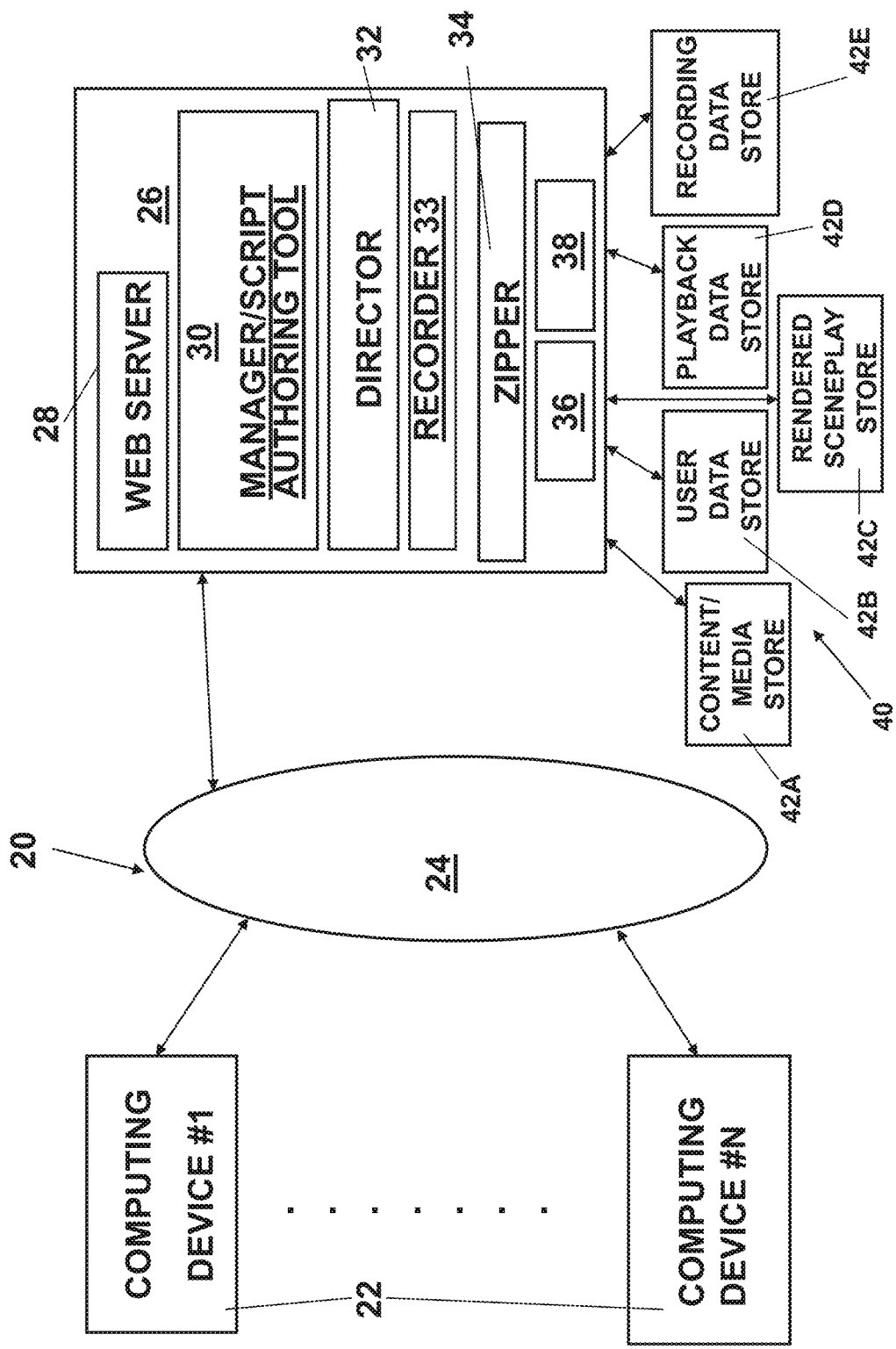
FIG. 1 is a block diagram of an example of a media generation system.

The system and method are particularly applicable to a web-based system for video scenes as illustrated and described below and it is in this context that the system and method will be described. It will be appreciated, however, that the system and method have greater utility since the system can be implemented using other technology solutions than those specifically described below. In addition, the system and method may be used for various different types of media/content in addition to videos wherein the media/content may include, but is not limited to, audio, three dimensional animation, video and audio, animatronics, three dimensional models and robots. Furthermore, in addition to the individual scenes with two people example described below, the system and method may be used to: 1) compile multiple scenes with multiple actors/people into a larger production, such as a movie, or into a series of scenes; or 2) compile multiple scenes with a single actor/person performing in all of the scenes.

The media generation system and method may be used to empower an audience to make "co-creative" interactive entertainment for a generation reared on "doing instead of viewing." In addition the system and method deconstructs linear story structure so it can be reconstructed by remote users to create a cinema of the 21st Century. In the descriptions below, an exemplary embodiment of the media generation system and method used for video scenes with scripts is described although the media generation system and method are not limited to this particular embodiment.

In the video scene generation and play system and method embodiment, the system and method perform various processes to achieve the goal of generating a video scene. The system may assemble/have a scripts store from which a script can be selected for use in the system. The system may then process the scripts using a script editor to generate a marked-up script using various languages and formats, such as for example a particular encoding language (SPML) as described below that is based on the well known XML language or any other known or yet to be developed mark-up language. Thus, the marked-up script may utilize various different formats and styles and the marked-up script is not limited to any particular language format or style. The marked-up script may be delivered to one or more computing devices 22 (as described below with reference to FIG. 1) using various protocols such as file/data lossless transfer protocols such as HTTP, HTTPS or FTP and the media associated with the marked-up script as described below may be delivered using various streaming data protocols such as RTSP, RTMP, UDP, etc. The system may also provide tools so users can write and/or input their own scripts. The system may also be used to create a social network for users of the system. The system may also enable users to select scripts, scenes and characters they want to play in a particular scene. The system may also provide a director (that can be onscreen or offscreen such as a robot for example, audio based with no visual display, on a different screen and/or triggered by the marked-up script code) to display dialog, screen, blocking direction and/or any directions supplied to the user which helps the user enact their part (emotions, volume, cadence, lighting, etc.). The system may also provide a recording tool that records a user performing in a particular format, known as a splitscene, and then adds additional data to the marked-up script data. The system also provides a zipper technology that allows a user to zip their splitscene up with other splitscenes so that they can be combined into one or more pieces of media, known as a sceneplay. The sceneplay may be a rendered file or various other formats. For example, the sceneplay may be a media file that can be played by the appropriate media player wherein the media file has all of the data for the sceneplay. Alternatively, the sceneplay may be data that contains the marked-up script and is streamed/downloaded to a user's computer and the user's computer fetches the media as needed based on links in the data. The system also may provide a studio or virtual studio so users can share, market and distribute their media creations and/or promote themselves, purchase or provide services, etc. The system also may provide a product placement toolbar to enable users to monetize their creations and to enable brand rights holders to reach their constituents.

FIG. 1 is a block diagram of an example of a media generation system 20. In this example, the media generation system is a web-based media generation system, but the media generation system is not limited to the media generation system example shown in FIG. 1. The system may include one or more computing devices 22 (such as computing device #1—computing device #N) wherein each computing device is a processing unit based device with memory and connectivity (wired or wireless) that can operate and interface with the media generation system. For example, each computing device may be a wireless email device, a converged device, such as Blackberry™ device or Treo™ device, a personal computer, a game or platform, a laptop computer, a handheld computer, a cellular phone, a mobile phone, etc. To interface with the media generation system, a browser application or another application may be executed by the processing unit of the computing device that allows the computing device to interface with the media generation system over a link 24 that may be a wireless or wired network, a computer or communications network, the Internet, a WAN, a WLAN, a LAN, etc. Using the browser, each computing device may establish a communications session, using a known protocol such as a data/file transfer protocol or a streaming protocol as described above, over the network 24 to a media generation unit 26 that is also coupled to the network 24 that may be, in the example shown in FIG. 1, one or more server computers. In the example shown in FIG. 1, the media generating unit 26 is located remote from the one or more computing devices 22. However, the media generating unit 26 may also be incorporated into a particular one or more of the computing devices 22 so that the particular computing device 22 can both generate/assemble the media as well as play the assembled media.

In the example shown in FIG. 1, the media generator unit 26 may further comprise a web server 28 that formats and delivers a plurality of web pages to the one or more computing devices (to be displayed on the browser, by a plug-in application or using a client application) that allow each computing device to display data and information generated by the media generation unit and allow each computing device to input information into a web page form and communicate that information to the media generation unit. The media generation unit 26 may further comprise a manager/script authoring tool 30, a director 32, a recorder 33, a zipper 34, a studio 36 and a product placement toolbar 38. The web server 28, the manager/script authoring tool 30, the director 32, the recorder 33, the zipper 34, the studio 36 and the product placement toolbar 38, in one embodiment of the media generation system shown in FIG. 1, may each comprise a plurality of lines of computer code that are executed by the one or more processing units of the media generation unit 26. The manager/script authoring tool 30 allows a user of each computing device to develop a new script or modify an existing script. The manager/script authoring tool 30 may also receive a raw script file as input and then insert intelligence to the script such as initial set-up, shot set-up and other information that may be inserted into the script to generate a marked-up script that may use, for example, a scripting language known as sceneplay markup language (SPML). The manager/script authoring tool 30 may further comprise a script editor that is a tool that generates a marked-up script. The director 32 is a tool that instructs users and/or controls the environment of the computing devices (such as peripherals connected to the computing devices such as a robot or external network attached to the computing device) on how to act out a portion of the piece of media (known as a splitscene) to be acted out by a particular user or two or more users together wherein the director includes stage directions, blocking, dialog, audio levels, lighting and the like. The system may further include the recorder 33 that records each user as they act out his/her splitscene. The zipper 34 is a tool that intelligently combines two or more splitscenes into a piece of media, known as a sceneplay wherein the sceneplay may be a fully rendered file or rendered on the fly as described above and may be rendered at the server side or at the computing device 22 side. The studio 36 is a tool that provides features that enable users to share, market, and distribute the sceneplays. In particular, the studio 36 allows a splitscene to finds its corresponding splitscene to form the media in that the studio 36 allows a user to post their splitscene, notify other users of the splitscene and allow sharing of the splitscene with privacy features. The privacy features allow a user to limit the use of their splitscene and their images. For example, when the media is rendered on the fly, it is possible for the owner of a splitscene to not allow the use of that splitscene based on the privacy settings. The system may also notify other users when a new splitscene is posted and available to be used and/or the system may present a user who posts a new splitscene with any/all of the already existing splitscenes that can be used with the newly posted splitscene.

The media generating system allows product placement opportunities to be identified, generated and monetized. For example, using the script editor, product placement opportunities that occur within the narrative can be identified in the marked-up script. Later, as users record their splitscenes, they can choose what props, costumes or other objects to have included onscreen as they record. For example, users can choose a particular brand of soda, when the narrative indicates that they are drinking a soda, and the user can manually indicate to the system via check boxes, etc. what brand they used as they recorded their splitscene. Alternatively, the image of the branded prop can be digitally inserted into the media generated by use of compositing technologies including a travelling matte type application. The completed product placement also may be identified via counting for payment purposes.

The product placement toolbar 38 may be used by a third party consumer of the media generating system, an employee of the media generating system, or any third parties to monetize sceneplays.

Using the manager/script authoring tool 30, the director 32, the recorder 33, the zipper 34 and the studio 36, a user may, based on a script, develop a piece of media known as a sceneplay, such as a video, that has one or more splitscenes wherein each splitscene is a recording of a particular user's portion of a scene that are combined together into the sceneplay. The system also allows a user to use the product placement toolbar 38 to monetize the sceneplay based on product placements.

The media generation system allows the one or more splitscenes to be separately/independently recorded and then later combined together into the sceneplay or rendered on the fly into a sceneplay. The media generation system also allows the owner of a splitscene, when the media is rendered on the fly, to un-combine/remove the splitscene and/or to globally replace a user with another user. The manager/script authoring tool 30, the director 32, the recorder 33, the zipper 34, the studio 36 and the product placement toolbar 38 are described in more detail below.

The media generation unit 26 may have a storage unit 40 that may store one or more pieces of data associated with the media generation unit 26. The storage unit 40 may be one or more file systems (hardware or software) and/or one or more databases (hardware or software). When the storage unit 40 is implemented as one or more file systems or databases, the one or more file systems or databases may be located at disparate geographic locations or at the same geographic location. As shown in FIG. 1, the media generation unit 26 may include a content/media store 42A, a user data store 42B, a rendered sceneplay store 42C, a playback data store 42D and a recording data store 42E wherein these stores may be stored in the same storage unit or in different storage units that may be or may not be geographically dispersed.

The content/media store 42A may include one or more scripts, one or more marked-up scripts, one or more pieces of splitscene data and/or one or more media files that may be used to generate a splitscene. For example, the media files may be stock footage, effects, music, brand images, etc. In one embodiment, the script data may include: title; author; date; director; production data (for example, when original work was published, filmed, and/or broadcast); all related data or IDs to speak to external databases (e.g. IMDB); licensing data for script usage; script ranking within sceneplay.com to drive "most popular lists." In one embodiment, the splitscene data may include: character(s); timings; product placement opportunities and usage count for licensing purposes, targeted marketing and/or ranking of different splitscenes.

The user data store 42B may store data associated with a user, his/her profile and his/her account. In one embodiment, the user data may include: unique user ID; name, age, sex, location; physical attributes such as height, weight, hair & eye color; type of 'actor': e.g.: ingénue, character, mature, romantic lead, etc.; troupes that the user belongs to (groups within a particular community); special talents: voice, comedy, Shakespearean, ventriloquist, juggler, director, writer, costumer, make-up artist; user favorites or preferences: favorite actors, directors, movies, music, genres; ratings data—what content they have access to based upon age, or personal preference—show me no scripts or stock footage that contain violence or nudity etc . . . . or MPAA ratings; sceneplays or splitscenes the user has recorded. Details about when, where, and with whom the user "zipped up with"; privacy settings: preferences about how much personal data they want to share and with whom, e.g. entire website or social network, affiliates or just their friends'—or 'troupes'; and user ranking within website or social network to drive most popular lists. Each user record in the user data store may have a link to each splitscene associated with the particular user.

The rendered sceneplay store 42C may store one or more recorded sceneplays. The rendered sceneplay store 42C may be capable of streaming these rendered sceneplays to users. This store may also include usage count data for licensing purposes, targeted marketing and/or ranking of different sceneplays.

The playback data store 42D may store playback data for splitscenes and/or sceneplays wherein the data about each splitscene or sceneplay is linked to its associated splitscene or sceneplay. The playback data store 42D may count the display and/or use of sceneplays, marked-up script, splitscenes, video and/or components of the video (e.g. product placements) and popularity of users, etc. by noting how often different aspects of the system are used, searched, zipped, shared, displayed, etc.). In another example, each computing device 22 may be an intelligent client that selects advertisements based on a user (and his/her characteristics), based on the marked-up script being played, etc.

The recording data store 42E may store sync data 59 (shown in FIG. 2) and recording context data. The sync data and the recording context data may be known collectively as recording data. The sync data 59 may include, for a particular portion of a particular scene, a file path or URL, a start time and an end time. The recording context data may include data about the context of each recorded splitscene including a user identifier, a splitscene identifier, a location of the splitscene (such as using GPS), a time of day of the shooting of the splitscene and camera data for the splitscene. The recording data store may also include an identifier and constituent user IDs; counting (views) for licensing and advertising (product placement payment); and length, associated music, special effects, and other data within the website or social network. In one embodiment, the product placement data may include: brand market partner data; use and placement within video data; counting of display and/or views; and most popular brands within each sceneplay.

Figure 2:
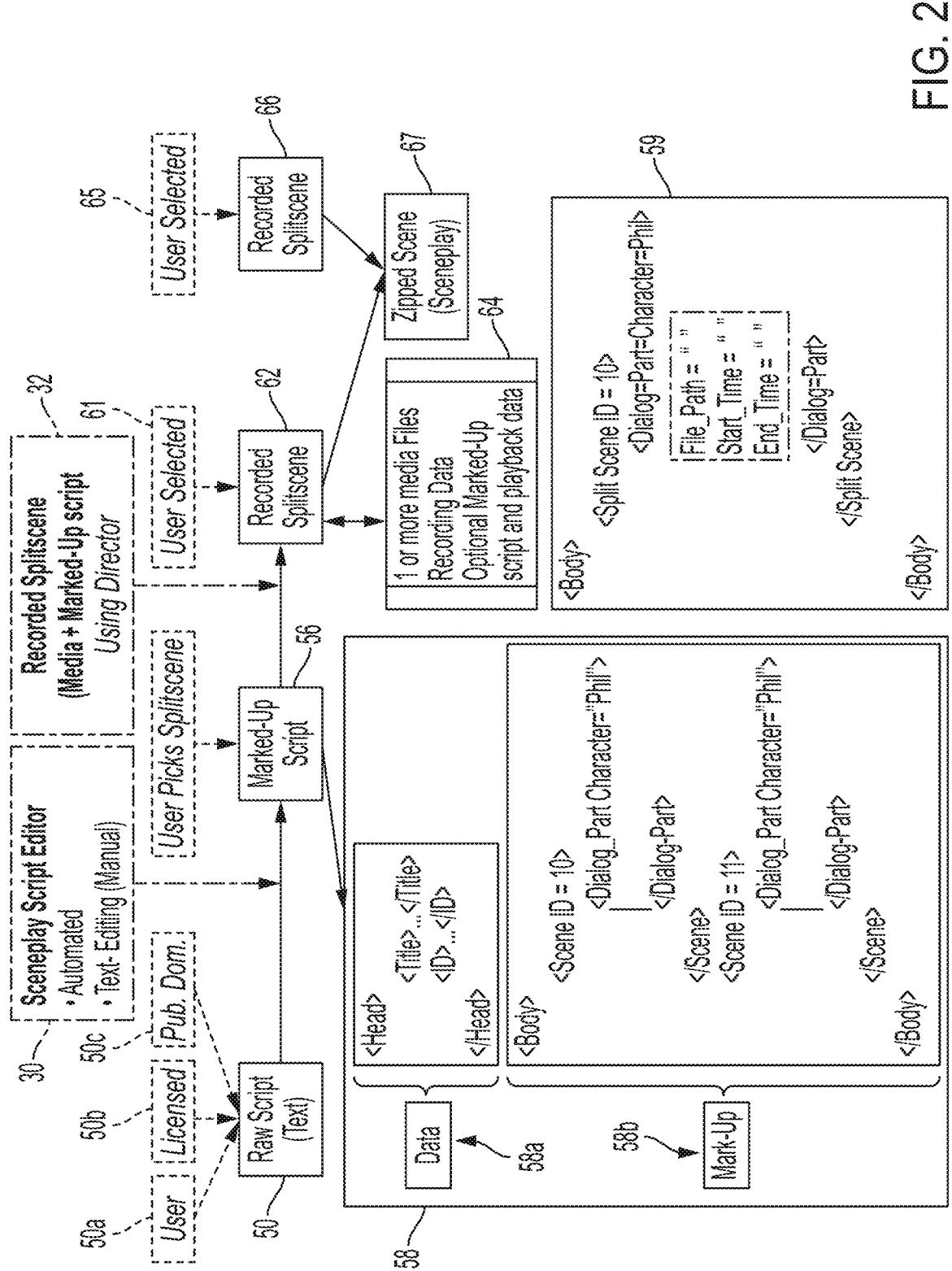
FIG. 2 illustrates more details of the media generation system.

FIG. 2 illustrates more details of the media generation system wherein the flow of the data and piece of media data in the media generation system is shown. The process steps shown in FIG. 2 are performed by one or more computing devices as well as the media generation unit shown in FIG. 1. A piece of raw script (usually a text file) 50 may be input/stored/retrieved from the media generation unit wherein the raw script that may be a user generated script 50a, a licensed script 50b and/or a public domain script 50c. The licensed script 50b also may include a media generating system original script. The raw script may be a video script, a theatrical script, a television script, a play script, a speech script, a debate transcription or a dialog-less scene. Using the script editor 30 (that may be automated or provide manual text editing), the raw script, is transformed into a marked up script 56 (for example in the SPML language). An example 58 of the marked up script is shown wherein the marked up script may further comprise data 58a (that may for example be tags as shown in FIG. 2) and a markup 58b (that may be for example stage directions and dialogs for a particular scene (with tags for the different parts of the scene)). The data of the media generating system may also include sync data 59 for a particular portion of a particular scene that may include a file path or URL, a start time and an end time. The sync data may be embedded into the marked-up script (to generate an augmented script), may be stored in a store (such as the recording data store 42E) or in any other type of storage.

Once the marked up script is completed, the user may, using the director 32, record a splitscene 62 for that particular script. The input to recording of the splitscene may be a marked-up script and optionally one or more already recorded splitscenes that can be used by the user during the recording of the splitscene. For example, a user can select an existing splitscene and then record their part based on the existing splitscene so that the two splitscenes can then be combined together. As another example, a user can select an existing splitscene and then record their splitscene by imitating the existing splitscene.

The recorded splitscene 62 may include a set of data 64 including one or more media files, sync data and recording context data (collectively recording data), a marked-up script (optional) and playback data (optional). Then, one or more splitscenes 62, 66 (both of which may be user selected or selected by the media generating system) may be combined together (using the zipper described above) into the sceneplay 67. The sceneplay 67 may be one or more splitscenes and playback data (optional). One or more sceneplays may be combined into a video, theatrical performance, a television episode, a play, a speech, a debate or a dialog-less scene. Thus, as shown, each splitscene may be independently developed by a user (at different times, locations, etc.) and then later combined together into the sceneplay.

In the embodiment in which the marked-up script is implemented using the SPML, the script editor 30 may be similar to a typical HTML/XML editor (may or may not be WYSIWIG) except that the tags (described in more detail below with references to FIGS. 4A-4B) are unique to the media generation system. In addition, the script editor may include user interface elements that make it easier to handle dialog and stage directions. For example: character names may appear in all capital letters at the center of the page; on the left-hand side of the page may be setting and time of day in all capital letters following the scene number; dialog may be placed towards the center of the page with a narrower margin and in upper and lower case letters; stage directions and blocking may have a wider margin, in upper and lower case lettering which may be flush left; character notes may be in parentheses, upper and lower case lettering which appears within the dialog area. The script editor 30 may further allow the user to import a raw script and converting the raw script (as shown in FIG. 2) into an SPML format using some heuristics (for example uppercase letters could be mapped to character names, italics to stage directions etc.). Now, the data creation workflow is described in more detail.

Figure 3:
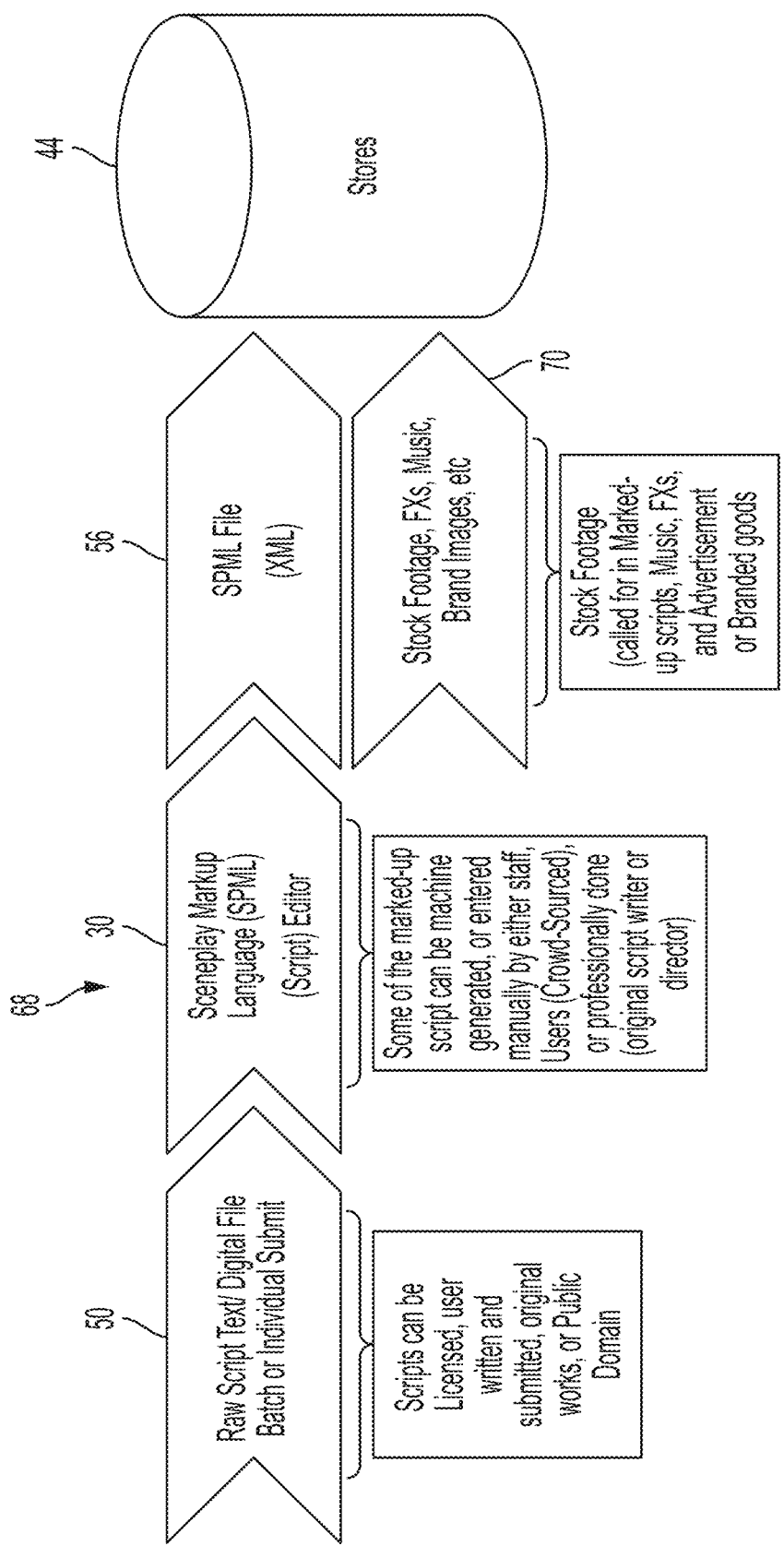
FIG. 3 illustrates a method for media data creation for the media generation system.

FIG. 3 illustrates a method 68 for media data creation for the media generation system. In the method, a raw script 50 may be used that is a text or digital file and may include batch or individual submissions. As shown in FIG. 2, the scripts may be licensed, user generated and submitted, media generator system original files or public domain works. The raw script 50 is then, using the script editor 30, converted into the marked-up script 56. The editor may generate the marked-up script automatically or it may be entered manually by media generation system, users or professionally done (original script writer and/or director). The marked-up script 56 may then be stored in the content/media store 42A along with other content 70 such as stock footage, effects, music, brand images, etc. The other content 70 would then be identified/called for in the scripts or marked-up script code.

FIGS. 4A-B illustrate one example of the marked-up script that is used by the media generation system. The marked-up script may use a custom extended markup language (XML) format language/code (known as SPML) that adds code to text based scripts and drives the functionality of the director and the zipper. Each script that enters the database is marked up wherein the script may include user generated content (UGC), licensed content (Movie, Television, Jokes, Plays) and/or public domain content. The marked-up script can be machine-generated or manually created using the script editor. In addition, crowd sourcing techniques may be employed to generate the marked-up script.

FIGS. 4A and 4B show one example of marked-up script code. The marked-up script code may include a set of data 72 associated with the particular script. The marked-up script code may include a scene portion 74 wherein each scene may have an associated piece of marked-up script code wherein the scene portion 74 has one or more shot portions 76 which are each a shot that is part of the scene. Each shot may further comprise one or more splitscreen 77 (see FIG. 4B for example) with each splitscreen being a portion of the overall splitscene being generated and recorded by a particular user that is later combined into the sceneplay by the zipper. The marked-up script code, for each shot, may include an async instruction 80 that indicates whether or not the particular shot can be recorded at any time or a stock shot can be used. For example, the "async=true" instruction indicates that shot may be recorded asynchronously (e.g., at any time in any location and not necessarily in any order). Each shot, in the marked-up script code, may have a set of instructions 82 that specify which of the one or more characters/actors is/are associated with each component of the particular shot such as video and audio. Each character/actor can be associated with each component of the shot. Thus, the system forms a map for interactive cinema that directs one or more users in which images/sounds or both can come from any one of the one or more users or the audio and/or video can be generated from any source. The code may further comprise, for any particular shot, a set of blocking instructions 84 that provide typical blocking directions for a script, such as "screen left". The code may further comprise, for any particular shot, a set of camera directions 86 that may specify camera directions such as a camera angle or a camera lens length, etc. The code may further comprise, for any particular shot, a line of dialog 88 for a particular character. Thus, the marked-up script code contains the information to record each splitscene that is part of the sceneplay as well as other data associated with the sceneplay.

Figure 5:
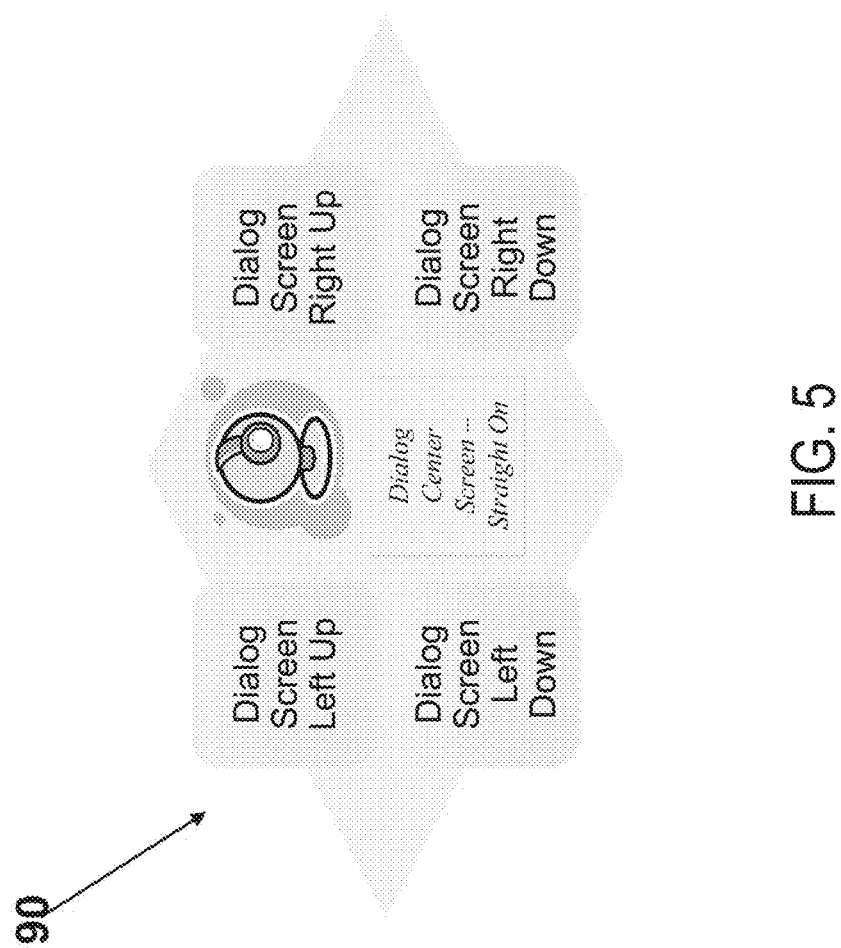
FIG. 5 illustrates an example of a user interface for user direction of the director of the media generation system.
Figure 6:
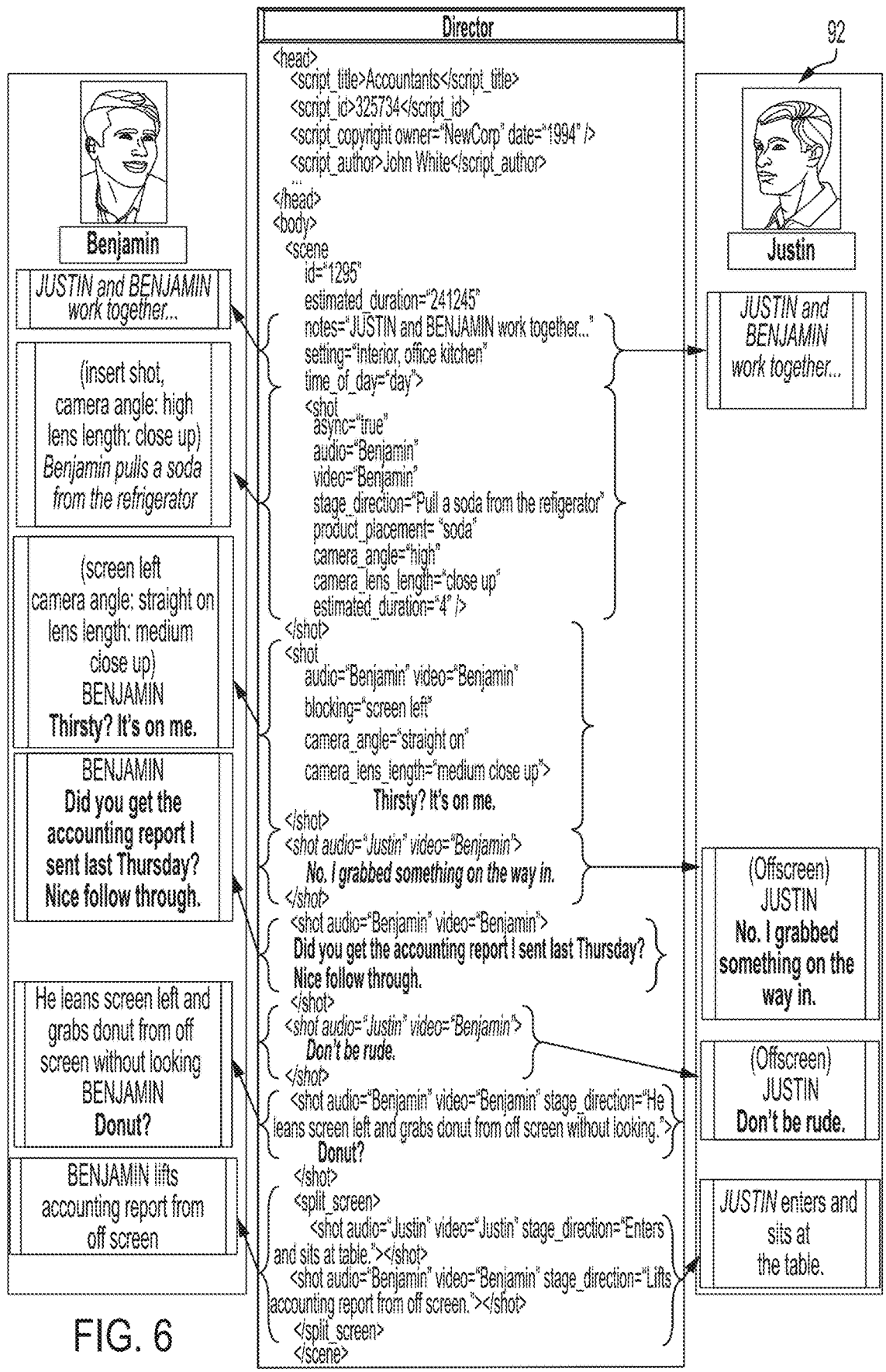
FIG. 6 illustrates an example of a user interface of the director of the media generation system.

FIG. 5 illustrates an example of a user interface 90 for user direction of the director of the media generation system and FIG. 6 illustrates an example of a user interface 92 of the director of the media generation system. As shown in FIG. 5, the director may include the user interface 90 that directs the user to where to look while recording the particular shot. As shown in the example in FIG. 6, the director presents scrolling dialog, stage and blocking directions to the user. The director instructs the user where to look and/or the director may present the dialog text at a specific place on the screen where the user should be looking in order to maintain the correct eye line. In addition, the text of the dialog as shown in FIG. 6 may be formatted in special ways to convey specific cues to each user such as, for example, bold for loud conversation/dialog, subscript for a whisper, red color for an angry voice, yellow color highlighted background for stage directions, etc . . . . The director may also display timing instructions to be displayed as a horizontal or vertical progress bar or by highlighting a word/sentence.

Figure 7:
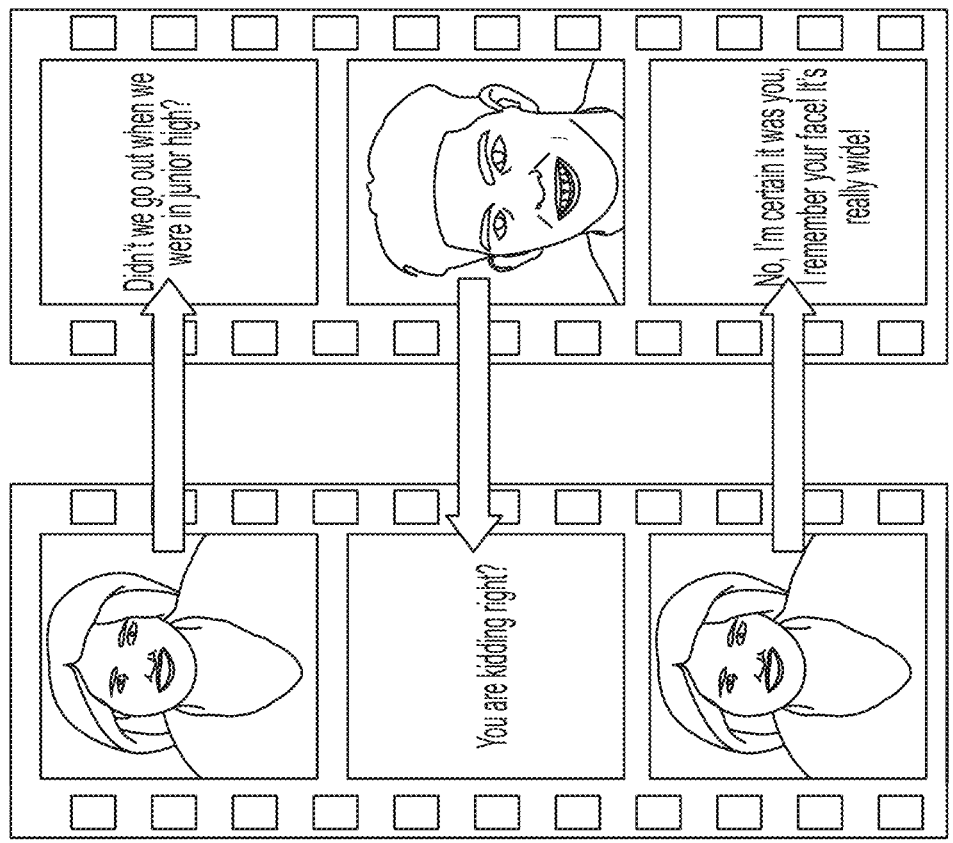
FIG. 7 illustrates an example of a scripted conversation using the media generation system.

FIG. 7 illustrates an example of a scripted conversation using the media generation system. In this example, an image shot of the particular actor and the dialog for that particular actor is shown in chronological order as shown in FIG. 7.

Figure 8:
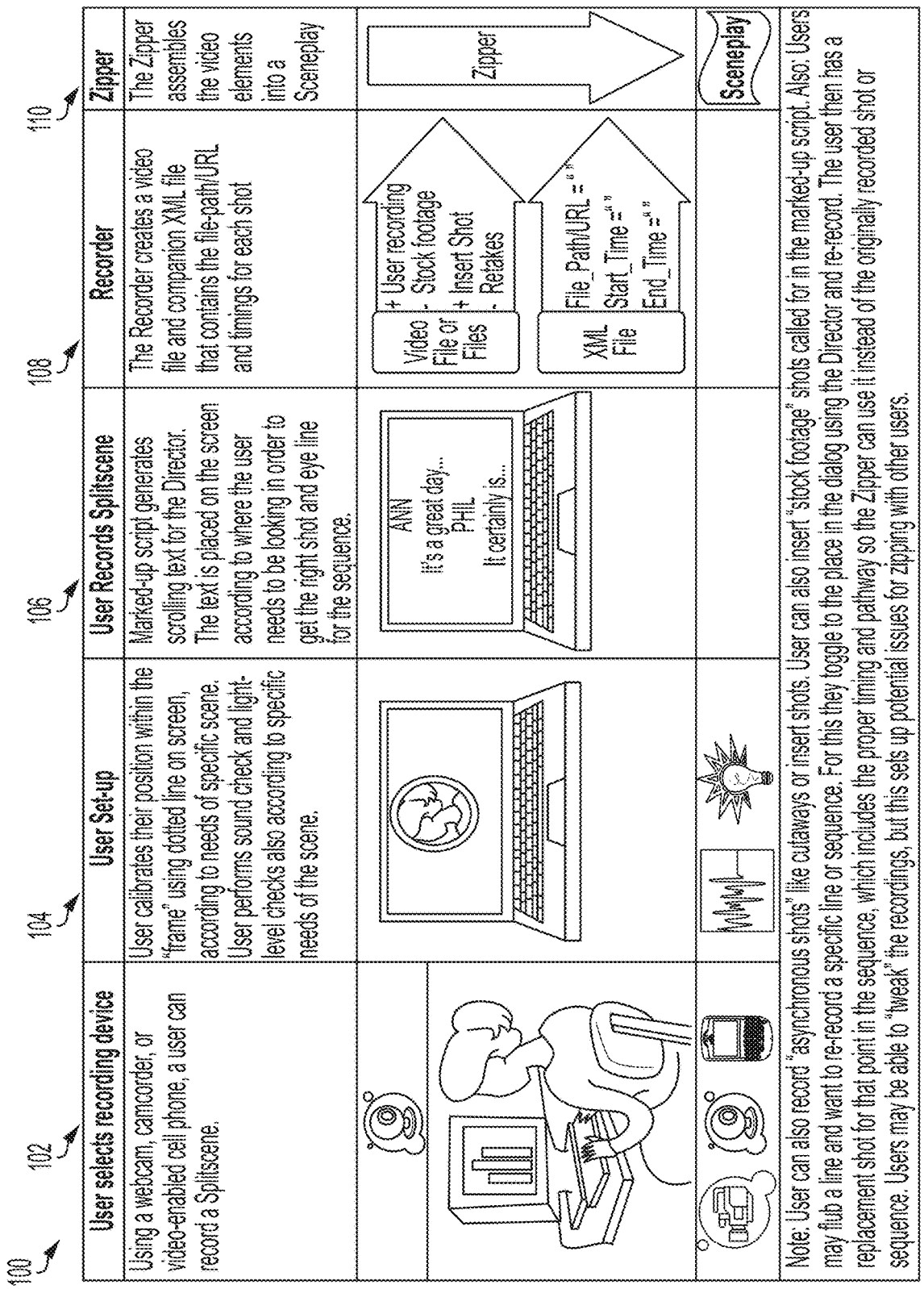
FIG. 8 illustrates a splitscene recording set up process.

FIG. 8 illustrates a splitscene recording set up process 100 using the media generation system. The process may include a recording device selection process 102, a user set-up process 104, a recording splitscene process 106 using the director, a splitscene recorder process 108 and a zipping process 110. The details of each process is shown in FIG. 8. Now, the splitscene recording process is described in more detail.

Figure 9:
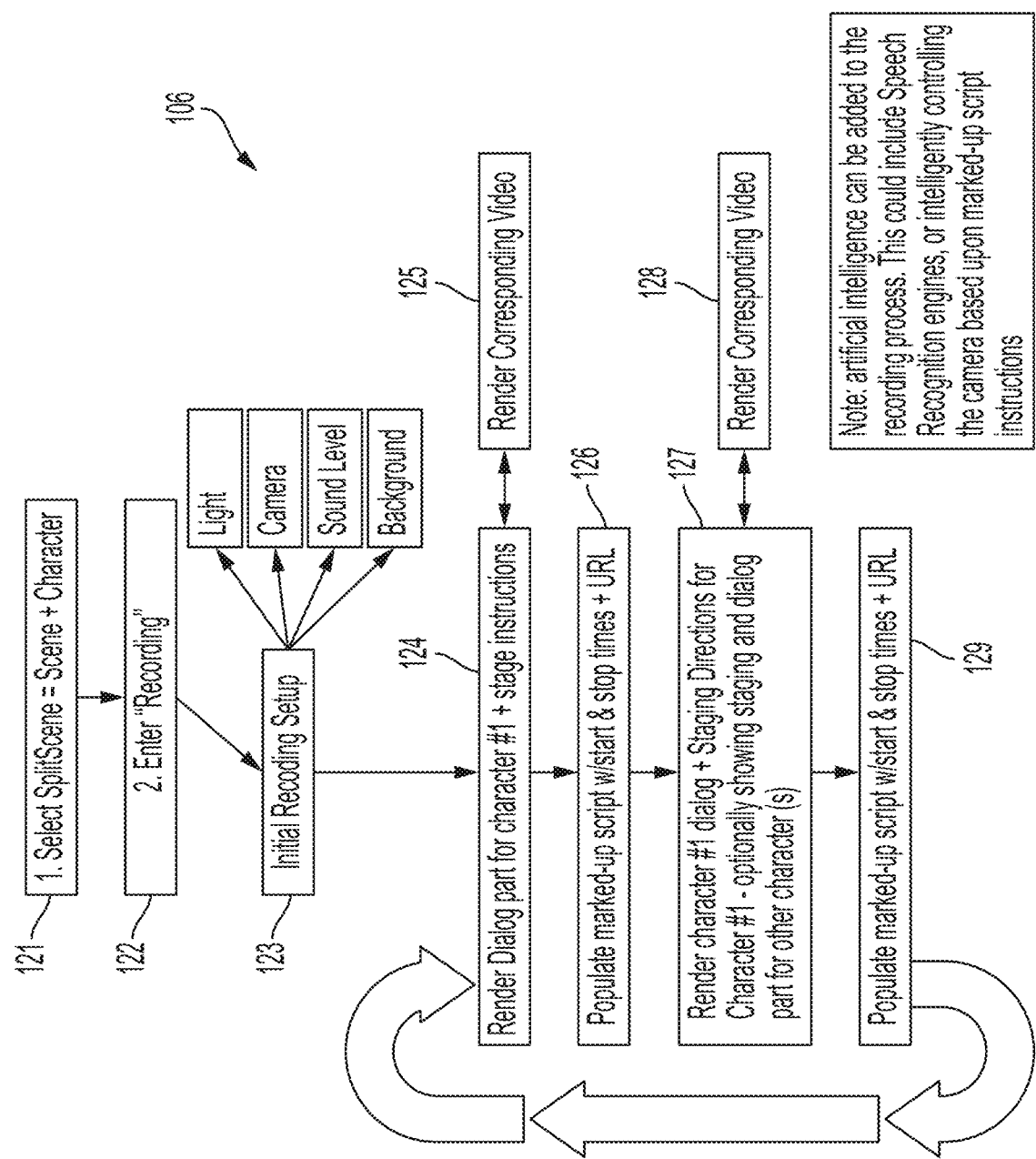
FIG. 9 illustrates a splitscene recording process.

FIG. 9 illustrates a splitscene recording process 106. The process may include the user selecting a splitscene that includes a scene and a character (121) and enter the recording (122). Then, an initial recording setup (123) is performed that may include various calibrations such as lights, cameras, sound levels and/or backgrounds. Once the setup is completed, the user can record the splitscene (and may redo it if not acceptable) in the processes 124-129. During the recording, the dialog for the character and the stage instructions for a particular shot are rendered by the director (124) and recorded in video (125). As the video is recorded, the filepath or URL and start/stop times for that shot are populated into the marked-up script as described above (126). Next, the dialog for the character (unless the splitscene is a dialog-less splitscene) and the stage instructions for a next particular shot are rendered by the director (127) (and may optionally show staging and dialog for other character(s)) and record the video (128) for the shot. Then the filepath and start/stop times for that next shot are populated into the marked-up script as described above (129). The processes 124-129 are then repeated for each shot in a splitscene to complete the recording. The splitscene recording may also use artificial intelligence that may include speech recognition engines or intelligently controlling the camera based upon marked-up script instructions. For example, signal analysis for recording may be done to user later during the zipping (such as the volume so that, when the splitscenes are combined, the volumes are more consistent). The recorder may also control ambient conditions, such as lighting. Now, the zipper tool is described in more detail.

Figure 10:
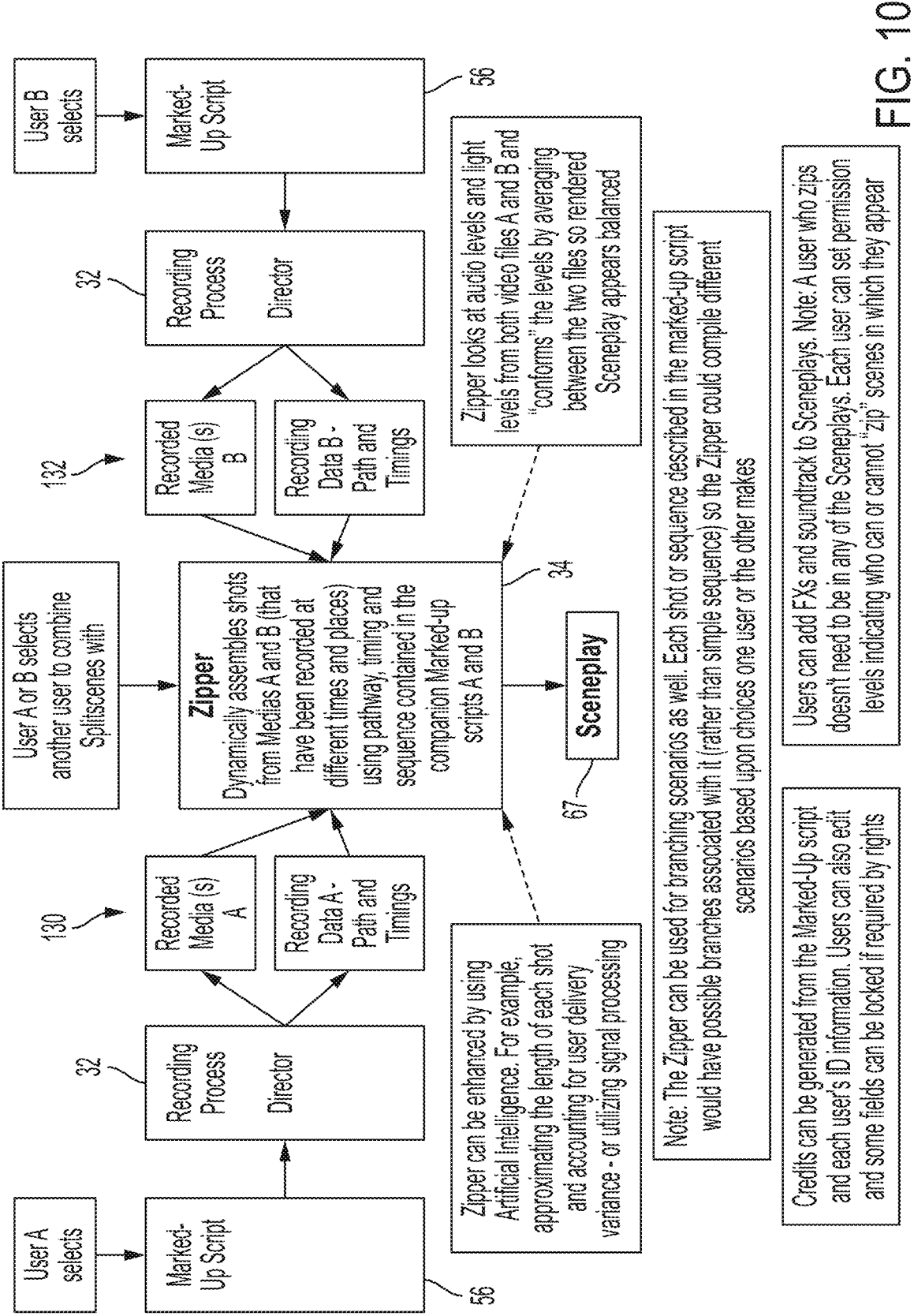
FIG. 10 illustrates the operation of a zipper element of the media generation system.

FIG. 10 illustrates the operation of a zipper element of the media generation system. As shown in FIG. 10, the zipper automatically combines two or more splitscenes 130, 132 to create a sceneplay 67. The zipper references the marked-up script of the scene along with the video file and the sync data in order to edit the associated splitscenes into a cohesive sceneplay 67. A number of techniques can be used to help the zipper determine the correct points at which to switch between each splitscene that may include: signal analysis of the audio and/or video can show when a character stops talking (whether the character is onscreen or off); speech recognition can be used to identify key words to help facilitate the switching; and/or artificial intelligence can also be used to augment the marked-up script, signal processing and speech recognition technology.

For each dialog part, the key elements needed for the zipping are in the marked-up script for the corresponding recorded splitscene and may include: which character is on the audio track (<audio>tag); which character is onscreen (<video>tag); video time codes (File_Path/URL, Start_Time and End_Time); and/or the type of shot (regular, split screen etc.). The zipper may loop through the marked-up script of the two splitscenes that need to be assembled and using the information in the previous paragraph it would concatenate the proper audio and video segments into the final sceneplay file. The sceneplay file 67 also may contain all or a part of the marked-up script data (e.g. dialog lines could be made into subtitles etc.).

As shown in FIG. 10, for each splitscene 130, 132, the splitscene is generated by a marked-up script 56 selected by a user that is then recorded using the director 32 to generate one or more recorded video(s) and the sync data (in any data format) with the filepaths/URLs and timings. In the example shown in FIG. 10, a first and second splitscene are combined together wherein the splitscenes may be recorded independently/separately and then combined together. The zipper 34 may then dynamically assemble the shots from the splitscene videos using the filepaths/URLs, timing information and sequences contained in the sync data to generate the sceneplay 67. However, the information contained in the sync data may also be embedded into the marked-up script thus eliminating the need for the separately stored sync data.

Figure 11:
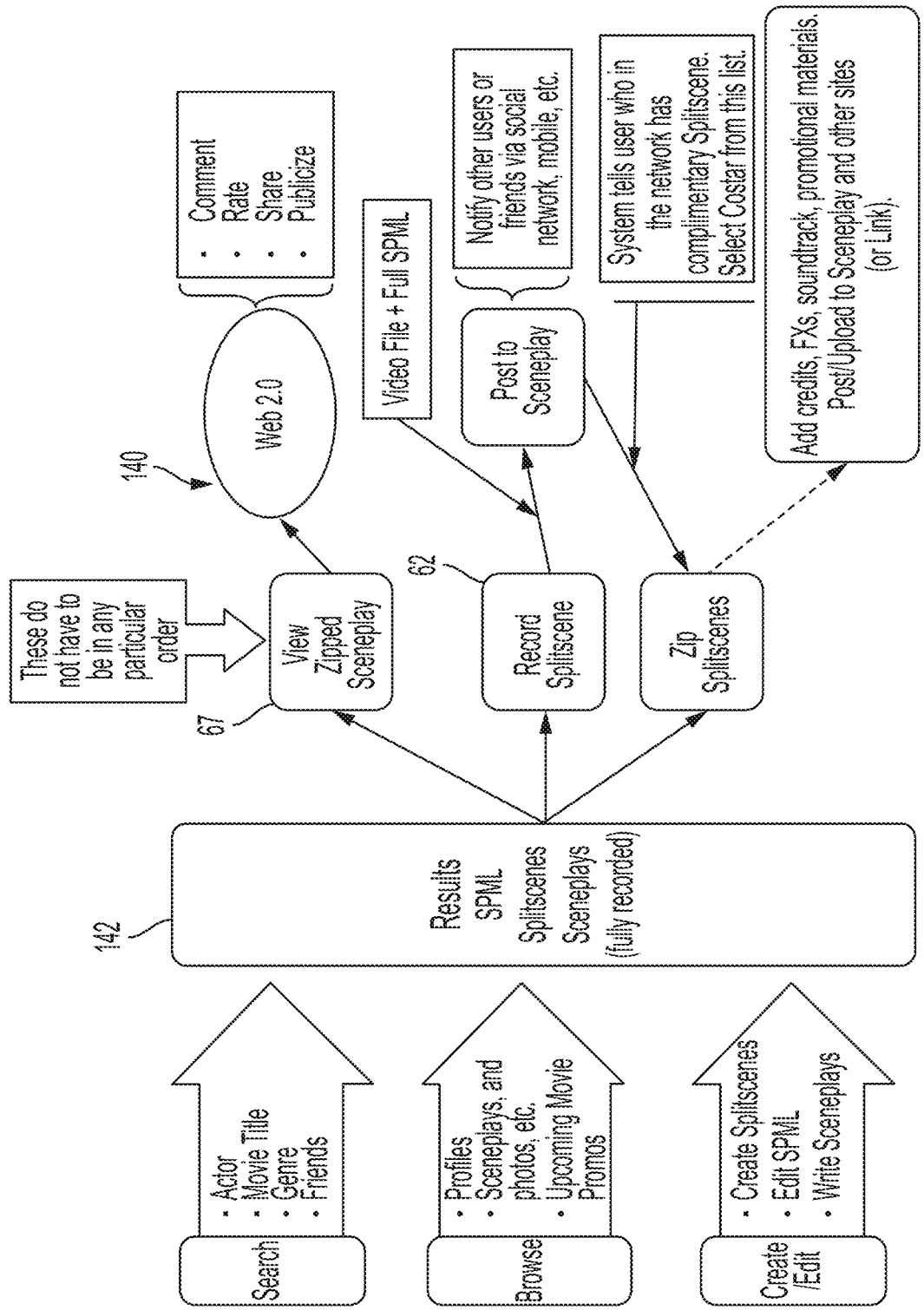
FIG. 11 illustrates an example of the user interaction flow of the media generation system.

FIG. 11 illustrates an example of the user interaction flow 140 of the media generation system. The system may provide search features (based on criteria such as: actors, movie titles, genre and/or friends), browsing features (based on profiles, sceneplays and/or photos, etc. and/or upcoming movie promos) and/or create/edit features (such as creating splitscenes, editing the marked-up script code and/or writing sceneplays). The results 142 (that may be stored in the storage unit of the media generation system) may include one or more pieces of marked-up script code, one or more splitscene(s) and one or more sceneplays. The results 142 may allow the user to view zipped sceneplays 67, record a splitscene 62 and/or zip a splitscene 62. The zipped sceneplays (which are already rendered) or the marked-up script with splitscenes that are rendered on the fly may be provided to various Web 2.0 services/companies (to permit comment, rating, sharing and/or publicity). The recorded splitscene(s) may be posted to a sceneplay website (wherein a user can then notify other users or friends about the splitscene via a social network, mobile, etc.) The system may also allow a user to add credits, special effects, soundtracks or promotional materials that may be posted or uploaded to the media generation system.

The media generation system may include a sceneplay. com web site that is a social network where members, known as sceneplayers, create and house their own video scenes, known as splitscenes. Sceneplay.com may provide members with licensed movie and television scripts. Members may choose the scene they want to be in and the role they want to play, and then record themselves saying the lines using a web cam (or other video recording device) and reading lines off of a scrolling text display. The website may have all the basic social networking capacities, including personalized pages, friend networks (troupes), messaging, newsfeeds, commenting, etc. When a user posts a recorded splitscene to the website, the social network may tell them who in their network has the complementary side of their splitscene. The network may also be informed of the new splitscene being posted—via newsfeeds, messages to mobile phones, and email. The media generation system may also allow—a user to select from other members who have recorded the complementary splitscenes. A user may then choose to zip the complementary splitscenes together in order to create a full sceneplay. The media generation system also allows members to share, market and distribute sceneplays using studio features and users can display headshots, make one-sheets and reels, get acting coaches or provide services for other sceneplayers. Now, the product placement toolbar/tool 38 is described in more detail.

Product Placement ToolBar/Tool

Digital video recorders enable users to time-shift and skip commercials which produces a need for brand marketers to employ novel forms of advertisement in order to reach the audience. Some online video companies place banner ads on the same webpage that the video is being displayed. Other online video companies insert video advertisement before or after the featured video content—known as "pre-roll or post-roll." The script editor of the media generation system provides the ability to identify product placement opportunities within a script. When marked-up script is generated, the product placement opportunities can be identified and when users record their splitscenes, they can select to use particular branded product to use within the sceneplay. Because each display of a splitscene may be counted, the display of the branded product can be monetized. Alternatively, a brand rights holder may choose to purchase the exclusive product placement opportunity rights within a particular sceneplay, users may be instructed to utilize that particular brand within their splitscene recording.

For the product placement tool, the user gets physical object before recording and indicates via manually checking a box (or some other method) which brand they have used. Alternatively, in the case of video compositing or via use of traveling matte technology, branded image can be mapped over whatever prop or costume, etc. employed as the user records. This is the preferred mode as it makes branding consistent between different user's splitscenes so there are no continuity issues at the time of zipping.

One function of the product placement toolbar may be to enable brand rights holders to bid upon or purchase the right to have their product offered to users to include in their sceneplays. Payment may be based upon number of uses and/or views. The more popular the sceneplay video becomes, the higher the potential advertising or product placement fee.

Another function of the product placement toolbar may allow users to see the rates that brand rights holders are willing to pay to have their product displayed within the video. Payment can be in the form of credits, microcash payments, coupons or entry into sweepstakes, etc. When a user records a splitscene, the product placement toolbar will appear and the user can select the particular brand they'd like to include.

Other Uses Of The Media Generation System

In addition to the use of creating a video scene as described above, the media generation system has a number of additional applications. The system can be employed whenever there is a desire for users to role-play using scripted actions and dialogue to record video that can be combined with another user's video. It should be appreciated that one user can generate all character parts in a scene, which can be combined into a cohesive whole. However, each part can be generated remotely and at different times. These additional applications include:

Casting Tool: The system may be used by casting directors to cast projects remotely without having to incur the expense of traveling to the actors or having the actors come to them. Casting directors can upload scripts to the system so that potential actors in remote locations can record their splitscene test (within the media generation system known as a splitscene.) Casting directors can review the actor's headshots, resumes and screentests without having to be in the same room with the candidate. Casting directors can review the screentest individually or can combine them with any number of other potential actor's screentests to get a preliminary feel for how the actors might work in a particular production. Casting directors can take advantage of the personalization tools where members indicate their features, age, type and special skills. Casting directors can share top candidates with directors, producers and other decision makers remotely, greatly reducing the cost of casting, especially for international productions or productions with multiple locations.

Online Dating Tool: Increasingly online dating services are incorporating video into their offerings. However, members are often at a loss as to what to say when they record their video. The media generation system may be used in online dating services to help members with scripted dialog and to enhance the member's ability to visualize themselves on a date with another member. Original scripts may be developed for specific use this market whereby different types of dating scenarios are described. For example, scripts for a 'casual date,' a 'funny date,' or an 'awkward encounter', can be written and put into the database. Members can then access the scripts, marked-up script, recorder and zipper technology in order to record a splitscene which can be then posted to their profile and zipped with other member's complimentary splitscene. Thus the members can have virtual dates online, before they would ever meet in person.

Sales and Media Training Tool: Corporations spend significant amounts of money training their sales staff and spokespeople. A private community can be built allowing companies to create custom scenes of typical sales pitches and prospect responses. This role-playing activity can be done remotely, or in large group training sessions, and can scale and be accessible on demand post-event. The technology can include "branching" so that the interactions between the customer role and the sales response become increasingly complex, and allow for more effective training. As a sales or spokesperson becomes more skilled increasing difficulty can be added, for instance, by turning off the scripted dialogue which tells the sales or spokesperson what to say. They record their video in real-time by responding to the customer's previously recorded video text or audio.

Interactive Promotional Videos: The system may be used for interactive promotional videos. Stars of film and television shows may be recorded following scripts that may be developed for use in the system. The star's splitscene video will be made available to users so that the user may record the complementary side of the splitscene, then zip the two sides together so as to view the completed sceneplay. Allowing users to see themselves in a scene with the star of the film or television show may provide a unique and effective way to market and promote the film or television program.

Foreign Language Training tool: The system may be used to help students record themselves speaking a foreign language which is scrolled onscreen to them. Recording virtual conversations while speaking a foreign language can help the student learn how to speak and interact in typical situations they might encounter in a foreign country. The foreign language training can be enhanced using video to help with gestures and customs not easily conveyed using text alone. Branching can also be used to help a student carry out a conversation in a more natural way. Video segments of a conversation may be randomly presented to the student so that the conversation can have a more natural flow. Also, text prompts can be turned off in order to help the student respond from memory. Later the student can check to see if their responses were correct in terms of translation when examined against the script.

Social Skills Training Tool: The system may be very beneficial for working with people who have social skills impairment, including those on the autistic spectrum or who have suffered or who have suffered injury to the parts of the brain controlling social skills. These people have difficulty reading non-verbal cues in communication. They benefit from direct training of these skills, including through the use of role-playing and the use of video as a feedback tool. The system can be 'seeded' with simple scripts for social interaction which can be used to train people suffering from these deficits.

In addition to the computer system example of the media generating system described above, the media generating system may be implemented so that part of the store 40 is contained on a piece of hardware, such as a chip, wherein the hardware may be installed/added to a device, such as a camera or video recorder. Then, the function of the media generating system, such as the director, may be used to control the viewfinder of the device and what the user records with the device may become the splitscene. Alternatively, the device may be sold to the user with a predetermined number of pre-made scenes and the user can record the splitscene from the pre-made scenes with the parameters of the device affecting the splitscene.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system, comprising:
a media generating computer system having a processor;
a store coupled to the media generating computer system that contains a script in a markup language for one or more recorded shots and one or more recorded splitscenes, the script having a scene with a plurality of shots, wherein each shot has a plurality of splitscenes, and wherein each splitscene is a portion of a shot derived from the script;
a computing device that connects to the media generating computer system using a streaming protocol and receives a rendered sceneplay from the media generating computer system using the streaming protocol; and
wherein the processor of the media generating computer system executes a plurality of instructions and is configured to:
automatically direct, based on the script stored in the store, a plurality of actors to each perform one or more actions of a character in the script in one of the plurality of splitscenes specified in the script including to perform the one or more actions of the character and direct a camera using a set of camera directions including a camera angle and a camera lens height for the recorded splitscene, and to generate a recorded splitscene content for each actor and two or more recorded splitscenes, wherein the processor of the media generating computer system is further configured to display, on a display of the computing device based on the script, scrolling dialog, stage and blocking directions to each actor to perform the one or more character actions during the recorded splitscene, each recorded splitscene of the content having a timing for the respective shot of the recorded splitscene; and
automatically edit and combine, without user interaction and based on the script and the timing for each shot in two or more recorded splitscenes, the two or more recorded splitscenes into the rendered sceneplay.

2. The system of claim 1, wherein the rendered sceneplay is one of an audio only combined media presentation and a dialog-less combined media presentation.

3. The system of claim 1, wherein the store further comprises stock footage and wherein the processor of the media generating computer system is further configured to combine the two or more recorded splitscenes and the stock footage into the rendered sceneplay.

4. The system of claim 1, wherein the processor of the media generating computer system is further configured to record one or more shots for the plurality of actors acting in the one or more shots of the script to generate the recorded splitscene.

5. The system of claim 1, wherein the rendered sceneplay further comprises one of a video, a three dimensional animation, an animatronics presentation, and a three dimensional model.

6. The system of claim 1, wherein each of the plurality of actors further comprises one of a puppet, a person, an avatar, and a robot.

7. The system of claim 1, wherein the processor of the media generating computer system is further configured to display instructions for where the actor should look during the recorded splitscene.

8. The system of claim 1, wherein the processor of the media generating computer system is further configured to display the script, scrolling dialog, stage and blocking directions to each actor at a location in which the actor should be looking during the recorded splitscene.

9. A method, comprising:
storing a script in a markup language for one or more recorded shots and one or more recorded splitscenes, the script having a scene with a plurality of shots, wherein each shot has a plurality of splitscenes, and wherein each splitscene is a portion of a shot derived from the script;
automatically directing, by a director that is part of a computer based media generation system and based on the script stored in the store, a plurality of actors to each perform one or more actions of a character in the script in one of the plurality of splitscenes specified in the script including performing the one or more actions of the character and directing a camera using a set of camera directions including a camera angle and a camera lens height for the recorded splitscene, and generates a recorded splitscene content for each actor and two or more recorded splitscenes, wherein the automatically directing of each actor further comprises displaying, on a display of the computing device based on the script, scrolling dialog, stage and blocking directions to each actor to perform the one or more character actions during the recorded splitscene, each recorded splitscene of the content having a timing for the respective shot of the recorded splitscene;
automatically editing and combining, by a zipper of the computer based media generation system and without user interaction and based on the script and the timing for each shot in two or more recorded splitscenes, the two or more recorded splitscenes into a rendered sceneplay; and
streaming, to a computing device using a streaming protocol, the rendered sceneplay.

10. The method of claim 9, wherein the rendered sceneplay is one of an audio only combined media presentation and a dialog-less combined media presentation.

11. The method of claim 9, wherein storing further comprises storing stock footage and wherein automatically editing and combining further comprises combining the two or more recorded splitscenes and the stock footage into the rendered sceneplay.

12. The method of claim 9, further comprising recording, using a recorder of the computer based media generation system, one or more shots for the plurality of actors acting in the one or more shots of the script to generate the recorded splitscene.

13. The method of claim 9, wherein the rendered sceneplay further comprises one of a video, a three dimensional animation, an animatronics presentation, and a three dimensional model.

14. The method of claim 9, wherein each of the plurality of actors further comprises one of a puppet, a person, an avatar, and a robot.

15. The method of claim 9, wherein the automatic directing further comprises displaying instructions for where the actor should look during the recorded splitscene.

16. The method of claim 9, wherein the automatic directing further comprises displaying the script, scrolling dialog, stage and blocking directions to each actor at a location in which the actor should be looking during the recorded splitscene.

17. A system, comprising:
a media generating computer system having a processor;
a store coupled to the media generating computer system that contains a script in a markup language for one or more recorded shots and one or more recorded splitscenes, the script having a scene with a plurality of shots, wherein each shot has a plurality of splitscenes, and wherein each splitscene is a portion of a shot derived from the script; and
wherein the processor of the media generating computer system executes a plurality of instructions and is configured to:
automatically direct, based on the script stored in the store, a plurality of actors to each perform one or more actions of a character in the script in one of the plurality of splitscenes specified in the script including to perform the one or more actions of the character and direct a camera using a set of camera directions including a camera angle and a camera lens height for the recorded splitscene, and to generate a recorded splitscene content for each actor and two or more recorded splitscenes, wherein the processor of the media generating computer system is further configured to display, on a display of the computing device based on the script, scrolling dialog, stage and blocking directions to each actor to perform the one or more character actions during the recorded splitscene, each recorded splitscene of the content having a timing for the respective shot of the recorded splitscene; and
automatically edit and combine, on the fly, without user interaction and based on the script and the timing for each shot in two or more recorded splitscenes, the two or more recorded splitscenes into a combined media presentation.

18. The system of claim 17, wherein the combined media presentation is one of an audio only combined media presentation and a dialog-less combined media presentation.

19. The system of claim 17, wherein the store further comprises stock footage and wherein the processor of the media generating computer system is further configured to combine the two or more recorded splitscenes and the stock footage into the combined media presentation.

20. The system of claim 17, wherein the processor of the media generating computer system is further configured to record one or more shots for the plurality of actors acting in the one or more shots of the script to generate the recorded splitscene.

21. The system of claim 17, wherein the combined media presentation further comprises one of a video, a three dimensional animation, an animatronics presentation, and a three dimensional model.

22. The system of claim 17, wherein each of the plurality of actors further comprises one of a puppet, a person, an avatar, and a robot.

23. The system of claim 17, wherein the processor of the media generating computer system is further configured to display instructions for where the actor should look during the recorded splitscene.

24. The system of claim 17, wherein the processor of the media generating computer system is further configured to display the script, scrolling dialog, stage and blocking directions to each actor at a location in which the actor should be looking during the recorded splitscene.

25. A method, comprising:
storing a script in a markup language for one or more recorded shots and one or more recorded splitscenes, the script having a scene with a plurality of shots, wherein each shot has a plurality of splitscenes, and wherein each splitscene is a portion of a shot derived from the script;
automatically directing, by a director of a media generation computer system based on the stored script, a plurality of actors to each perform one or more actions of a character in the script in one of the plurality of splitscenes specified in the script including performing the one or more actions of the character and direct a camera using a set of camera directions including a camera angle and a camera lens height for the recorded splitscene, and generates a recorded splitscene content for each actor and two or more recorded splitscenes, wherein the director displays, on a display of a computing device based on the script, scrolling dialog, stage and blocking directions to each actor to perform the one or more character actions during the recorded splitscene, each recorded splitscene of the content having a timing for the respective shot of the recorded splitscene; and
automatically editing and combining, by a zipper of the media generating computer system on the fly, without user interaction and based on the script and the timing for each shot in two or more recorded splitscenes, the two or more recorded splitscenes into a combined media presentation.

26. The method of claim 25, wherein the combined media presentation is one of an audio only combined media presentation and a dialog-less combined media presentation.

27. The method of claim 25, further comprising storing stock footage and wherein the automatic editing and combining further comprises combining the two or more recorded splitscenes and the stock footage into the combined media presentation.

28. The method of claim 25, further comprising recorded, by a recorder of the media generating computer system, one or more shots for the plurality of actors acting in the one or more shots of the script to generate the recorded splitscene.

29. The method of claim 25, wherein the combined media presentation further comprises one of a video, a three dimensional animation, an animatronics presentation, and a three dimensional model.

30. The method of claim 25, wherein each of the plurality of actors further comprises one of a puppet, a person, an avatar, and a robot.

31. The method of claim 25, wherein the automatic directing further comprises displaying instructions for where the actor should look during the recorded splitscene.

32. The method of claim 25, wherein the automatic directing further comprises displaying the script, scrolling dialog, stage and blocking directions to each actor at a location in which the actor should be looking during the recorded splitscene.

* * * * *